United States Patent
Vallejo Ruiz et al.

(10) Patent No.: US 11,209,166 B2
(45) Date of Patent: Dec. 28, 2021

(54) COMBUSTOR ASSEMBLY FOR A TURBINE ENGINE

(71) Applicant: General Electric Company, Schenectady, NY (US)

(72) Inventors: Ernesto Andres Vallejo Ruiz, Cincinnati, OH (US); Aaron Michael Dziech, Crittenden, KY (US); Jonathon Eli Farmer, Newport, KY (US)

(73) Assignee: General Electric Company, Schenectady, NY (US)

( * ) Notice: Subject to any disclaimer, the term of this patent is extended or adjusted under 35 U.S.C. 154(b) by 87 days.

(21) Appl. No.: 16/210,385

(22) Filed: Dec. 5, 2018

(65) Prior Publication Data

US 2020/0182075 A1 Jun. 11, 2020

(51) Int. Cl.
| | | |
|---|---|---|
| *F23R 3/60* | (2006.01) | |
| *F23R 3/00* | (2006.01) | |
| *F02K 1/82* | (2006.01) | |
| *F01D 9/02* | (2006.01) | |

(52) U.S. Cl.
CPC ............... *F23R 3/60* (2013.01); *F02K 1/82* (2013.01); *F23R 3/007* (2013.01); *F01D 9/023* (2013.01); *F23R 2900/00012* (2013.01)

(58) Field of Classification Search
CPC .. F01D 9/023; F23R 3/007; F23R 3/60; F23R 2900/00012
See application file for complete search history.

(56) References Cited

U.S. PATENT DOCUMENTS

| | | |
|---|---|---|
| 6,265,078 B1 | 7/2001 | Atmur et al. |
| 6,284,089 B1 | 9/2001 | Anderson et al. |
| 6,436,507 B1 | 8/2002 | Pannell |
| 6,851,643 B2 | 2/2005 | Qiu et al. |
| 7,141,191 B2 | 11/2006 | Engwall et al. |
| 7,229,513 B2 | 6/2007 | Keith et al. |
| 7,546,743 B2 | 6/2009 | Bulman et al. |

(Continued)

FOREIGN PATENT DOCUMENTS

| | | |
|---|---|---|
| CA | 2934096 A1 | 1/2017 |
| CN | 101922354 A | 12/2010 |

(Continued)

OTHER PUBLICATIONS

Combined Chinese Office Action and Search Report Corresponding to Application No. 201910931808 dated Jan. 8, 2021.

*Primary Examiner* — Katheryn A Malatek
(74) *Attorney, Agent, or Firm* — Dority & Manning, P.A.

(57) ABSTRACT

A combustor assembly for a gas turbine engine defining a radial direction and a circumferential direction includes a liner assembly at least partially defining a combustion chamber and including at least one liner extending between a downstream end and an upstream end, the downstream end of the at least one liner defining a radial opening and an interface surface extending along the circumferential direction and along the radial direction; and a seal member including a body, a flange, and a radial element, the body defining a body surface extending along the radial direction and positioned adjacent the interface surface of the at least one liner, the flange extending forward from the body, and the radial element coupled to the flange and extending into the radial opening defined by the at least one liner.

20 Claims, 6 Drawing Sheets

(56) References Cited

U.S. PATENT DOCUMENTS

| | | |
|---|---|---|
| 7,686,990 B2 | 3/2010 | Gray |
| 8,141,370 B2 | 3/2012 | Bulman et al. |
| 8,266,914 B2 | 9/2012 | Hawie et al. |
| 9,034,128 B2 | 5/2015 | Lea et al. |
| 9,102,571 B2 | 8/2015 | Szweda et al. |
| 2006/0280955 A1 | 12/2006 | Spitsberg et al. |
| 2007/0240423 A1* | 10/2007 | Bulman ............... F23R 3/60 60/753 |
| 2008/0116614 A1 | 5/2008 | Morrison et al. |
| 2011/0219775 A1 | 9/2011 | Jarmon et al. |
| 2011/0281114 A1 | 11/2011 | Butler |
| 2013/0251958 A1 | 9/2013 | Gawn et al. |
| 2015/0003960 A1 | 1/2015 | Totten et al. |
| 2016/0215980 A1 | 7/2016 | Chang |
| 2018/0017258 A1 | 1/2018 | Stieg et al. |
| 2018/0031242 A1* | 2/2018 | Harding ............... F23R 3/60 |

FOREIGN PATENT DOCUMENTS

| | | |
|---|---|---|
| CN | 108729959 A | 11/2018 |
| EP | 1900507 A1 | 3/2008 |
| EP | 3115690 A1 | 1/2017 |
| FR | 2878608 A1 | 6/2006 |
| FR | 3055663 A1 | 3/2018 |
| GB | 2485215 A | 5/2012 |
| JP | 2013127355 A | 6/2013 |
| WO | WO2013/162989 A1 | 10/2013 |
| WO | WO2018/013393 A1 | 1/2018 |

* cited by examiner

COMBUSTOR ASSEMBLY FOR A TURBINE ENGINE

FEDERALLY SPONSORED RESEARCH

This invention was made with government support. The U.S. government may have certain rights in the invention.

FIELD

The present subject matter relates generally to a combustor assembly for a gas turbine engine, or more particularly to a seal assembly for a combustor assembly and a method for making the same.

BACKGROUND

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

More commonly, non-traditional high temperature materials, such as ceramic matrix composite (CMC) materials, are being used as components within gas turbine engines. For example, given an ability for CMC materials to withstand relatively extreme temperatures, there is particular interest in replacing components within the combustion section of the gas turbine engine with CMC materials. More particularly, an inner liner and an outer liner within the combustion sections of gas turbine engines are more commonly being formed of CMC materials.

By contrast, certain structural components surrounding the inner and outer liners, as well as the components located adjacent to such inner and outer liners, may be formed of a metal material. However, the differing coefficients of thermal expansion between the CMC liners and metal components may make it difficult to form a seal between the two components. Accordingly, a simplified assembly for forming a seal between the CMC components and metal components would be useful.

BRIEF DESCRIPTION

Aspects and advantages of the invention will be set forth in part in the following description, or may be obvious from the description, or may be learned through practice of the invention.

In one exemplary embodiment of the present disclosure, a combustor assembly for a gas turbine engine defining a radial direction and a circumferential direction is provided. The combustor assembly includes a liner assembly at least partially defining a combustion chamber and including at least one liner extending between a downstream end and an upstream end, the downstream end of the at least one liner defining a radial opening and an interface surface extending along the circumferential direction and along the radial direction; and a seal member including a body, a flange, and a radial element, the body defining a body surface extending along the radial direction and positioned adjacent the interface surface of the at least one liner, the flange extending forward from the body, and the radial element coupled to the flange and extending into the radial opening defined by the at least one liner.

In certain exemplary embodiments the at least one liner of the liner assembly is formed of a ceramic matrix composite material, and wherein the seal member is formed of a metal material.

In certain exemplary embodiments the body surface of the body of the seal member is slidably engaged with the interface surface defined by the at least one liner of the liner assembly.

In certain exemplary embodiments the body of the seal member defines a downstream seal surface configured for contacting a corresponding seal of an adjacent component within the gas turbine engine when installed.

In certain exemplary embodiments the radial opening is a first radial opening of a plurality of radial openings defined by the at least one liner at the downstream end of the at least one liner, and wherein the plurality of radial openings are spaced along the circumferential direction.

For example, in certain exemplary embodiments the radial element of the seal member is a first radial element of a plurality of radial elements of the seal member, and wherein each radial element of the plurality radial elements is coupled to the flange of the seal member and extends into a respective radial opening of the plurality of radial openings defined by the at least one liner.

In certain exemplary embodiments the radial opening defines a length along the radial direction and a constant cross-sectional geometry along the length.

In certain exemplary embodiments the at least one liner includes a wear coating positioned within the radial opening.

In certain exemplary embodiments the radial element of the seal member defines a cross-sectional geometry that is substantially equal to a cross-sectional geometry of the radial opening of the at least one liner.

In certain exemplary embodiments the seal member extends continuously along the circumferential direction to form a circumferential seal ring.

In certain exemplary embodiments the interface surface of the at least one liner extends continuously along the circumferential direction to form a complete loop.

In certain exemplary embodiments the at least one liner includes a plurality of liners spaced along the circumferential direction, and wherein the plurality of liners together define the interface surface.

In another exemplary embodiment of the present disclosure, a gas turbine engine defining a radial direction and a circumferential direction is provided. The gas turbine engine includes a compressor section, a combustor section, and a turbine section arranged in serial flow order, the combustor section including a combustor assembly, the combustor assembly including a liner assembly at least partially defining a combustion chamber and including at least one liner extending between a downstream end and an upstream end, the downstream end of the at least one liner defining a radial opening and an interface surface extending along the circumferential direction and along the radial direction; and a seal member including a body, a flange, and a radial element, the body defining a body surface extending along the radial direction and positioned adjacent the interface surface of the at least one liner, the flange extending forward from the body, and the radial element coupled to the flange and extending into the radial opening defined by the at least one liner.

In certain exemplary embodiments the turbine section includes a first stage of airfoil members, wherein the first stage of airfoil members includes a base defining an upstream end, wherein the upstream end includes a seal plate, and wherein the body of the seal member contacts the seal plate to form a seal with the seal plate.

For example, in certain exemplary embodiments the body of the seal member defines a downstream seal surface, and wherein the downstream seal surface contacts the seal plate to form the seal with the seal plate.

In certain exemplary embodiments the at least one liner of the liner assembly is formed of a ceramic matrix composite material, and wherein the seal member is formed of a metal material.

In another exemplary aspect of the present disclosure, a method for manufacturing a combustor assembly of a gas turbine engine, the combustor assembly including a liner assembly and a seal member, the liner assembly including at least one liner defining an interface surface at a downstream end, is provided. The method includes providing the seal member, the seal member extending continuously along the circumferential direction to form a seal ring; and moving the seal member onto the at least one liner such that a body surface of a body of the seal member contacts the interface surface defined by the at least one liner.

In certain exemplary aspects the seal member includes a flange, and wherein moving the seal member onto the at least one liner includes moving the flange of the seal member over a radial opening defined by the at least one liner.

For example, in certain exemplary aspects the seal member further includes a radial element, and wherein the method further includes moving the radial element of the seal member into the radial opening defined by the at least one liner; and coupling the radial element to the flange of the seal member.

In certain exemplary aspects the at least one liner of the liner assembly is formed of a ceramic matrix composite material, and wherein the seal member is formed of a metal material.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

DETAILED DESCRIPTION

Figure 1:
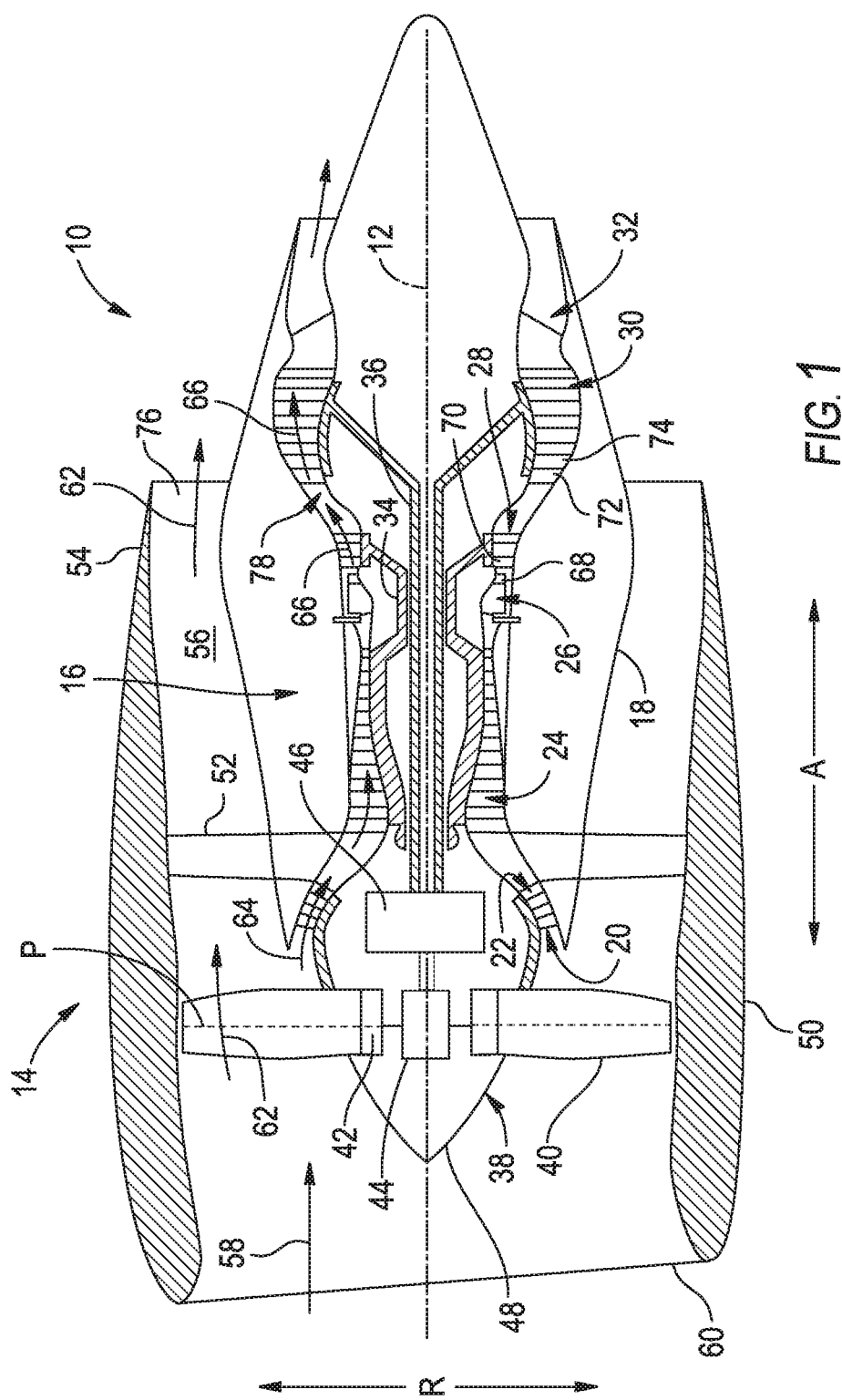
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the Figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The nacelle 50 is supported relative to the core turbine engine 16 by a plurality of circumferentially-spaced outlet guide vanes 52. A downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments the turbofan engine 10 may be any other suitable aeronautical gas turbine engine, such as a turboshaft engine, turbojet engine, turboprop engine, etc. Further, in still other exemplary embodiments, aspects of the present disclosure may be incorporated into any other suitable gas turbine engine, e.g., including any suitable number or configuration of shafts, compressors, turbines, etc. Moreover, although depicted as an aeronautical gas turbine engine, in other embodiments, aspects of the present disclosure may be incorporated into a land-based gas turbine engine, an aeroderivative gas turbine engine, etc.

Figure 2:
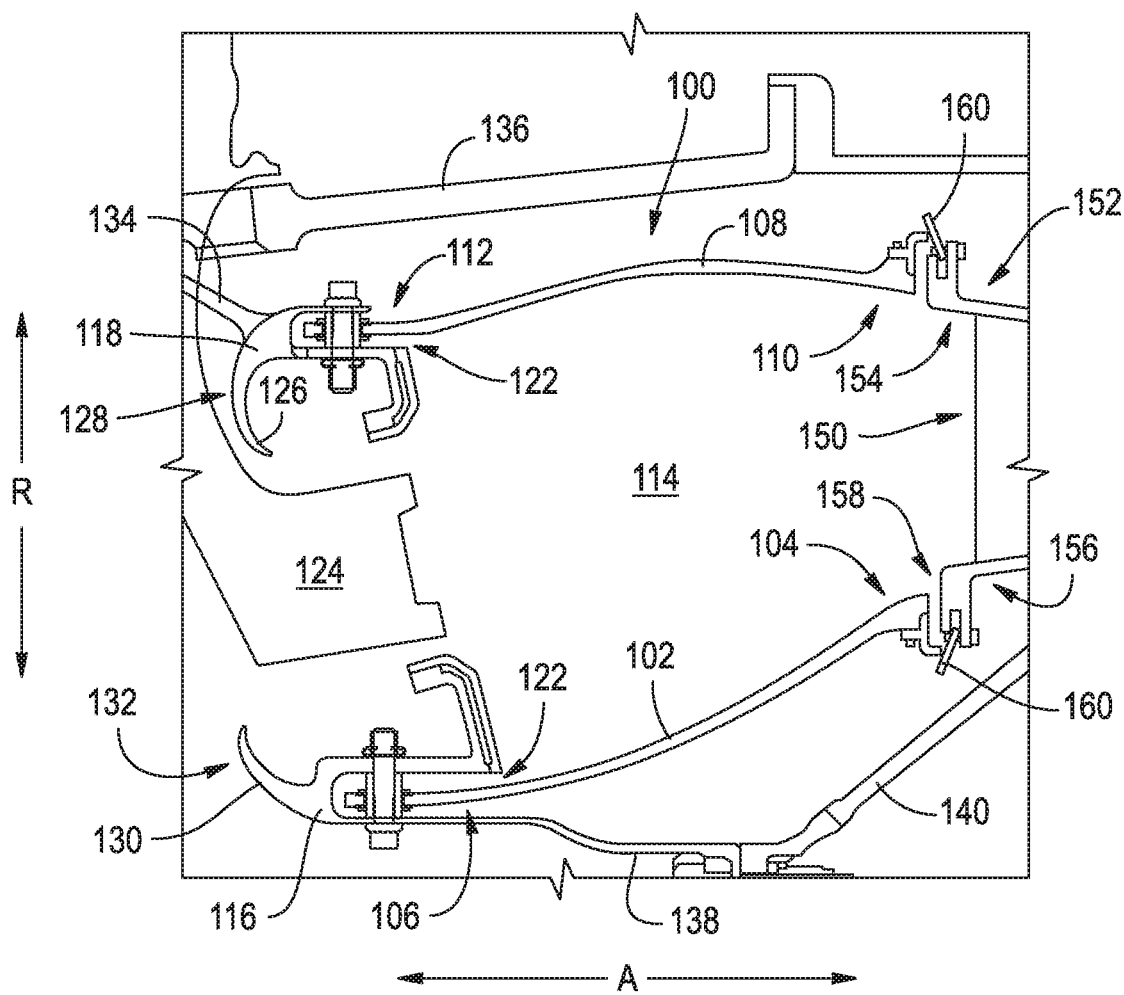
FIG. 2 is a schematic, cross-sectional view of a combustor assembly in accordance with an exemplary embodiment of the present disclosure.

Referring now to FIG. 2, a close-up cross-sectional view is provided of a combustor assembly 100 in accordance with an exemplary embodiment of the present disclosure. For example, the combustor assembly 100 of FIG. 2 may be positioned in the combustion section 26 of the exemplary turbofan engine 10 of FIG. 1. More particularly, FIG. 2 provides a side, cross-sectional view of the exemplary combustor assembly 100 of FIG. 2.

As shown, the combustor assembly 100 generally includes a liner assembly including at least one liner. Specifically, for the embodiment shown, the at least one liner of the liner assembly includes an inner liner 102 extending between a downstream end 104 (or aft end for the embodiment shown) and an upstream end 106 (or forward end for the embodiment shown) generally along the axial direction A, as well as an outer liner 108 also extending between a downstream end 110 and an upstream end 112 generally along the axial direction A. The inner and outer liners 102, 108 together at least partially define a combustion chamber 114 therebetween. As will be appreciated, for the embodiment shown the combustor assembly 100 is configured as an annular combustor, such that the inner and outer liners 102, 108 each extends along a circumferential direction C (see below) to define an circular/annular shape about a central axis (e.g., axis 12), and likewise such that the combustion chamber 114 is an annular combustion chamber. For example, the outer liner 102 may extend continuously along the circumferential direction C, or alternatively may include a plurality of liners forming a continuous outer liner for the combustor assembly 100. Similarly, the inner liner 108 may extend continuously along the circumferential direction C, or alternatively may include a plurality of liners forming a continuous inner liner for the combustor assembly 100. Such a configuration will be discussed in greater detail below.

Additionally, the inner and outer liners 102, 108 are each attached to an annular dome. More particularly, the annular dome includes an inner dome section 116 attached to the upstream end 106 of the inner liner 102 and an outer dome section 118 attached to the upstream end 112 of the outer liner 108. The inner and outer dome sections 116, 118 may be formed integrally (or alternatively may be formed of a plurality of components attached in any suitable manner) and may also each extend along the circumferential direction C to define an annular shape. The inner and outer dome sections 116, 118 each also at least partially define a slot 122 for receipt of the upstream end 106 of the inner liner 102, and the upstream end 112 of the outer liner 108, respectively.

The combustor assembly 100 further includes a plurality of fuel air mixers 124 spaced along a circumferential direction C and positioned at least partially within the annular dome. More particularly, the plurality of fuel air mixers 124 are disposed at least partially between the outer dome section 118 and the inner dome section 116 along the radial direction R. Compressed air from the compressor section of the turbofan engine 10 flows into or through the fuel air mixers 124, where the compressed air is mixed with fuel and ignited to create the combustion gases 66 within the combustion chamber 114. The inner and outer dome sections 116, 118 are configured to assist in providing such a flow of compressed air from the compressor section into or through the fuel air mixers 124. For example, the outer dome section 118 includes an outer cowl 126 at an upstream end 128 and the inner dome section 116 similarly includes an inner cowl 130 at an upstream end 132. The outer cowl 126 and inner cowl 130 may assist in directing the flow of compressed air from the compressor section 26 into or through one or more of the fuel air mixers 124.

Moreover, the inner and outer dome sections 116, 118 each include attachment portions configured to assist in mounting the combustor assembly 100 within the turbofan engine 10. For example, the outer dome section 118 includes an attachment extension 134 configured to be mounted to an outer combustor casing 136 and the inner dome section 116 includes a similar attachment extension 138 configured to attach to an annular support member 140 within the turbofan engine 10. In certain exemplary embodiments, the inner dome section 116 may be formed integrally as a single annular component, and similarly, the outer dome section 118 may also be formed integrally as a single annular component.

It should be appreciated, however, that in other exemplary embodiments, the inner dome section 116 and/or the outer dome section 118 may alternatively be formed by one or more components being joined in any suitable manner. For example, with reference to the outer dome section 118, in certain exemplary embodiments, the outer cowl 126 may be formed separately from the outer dome section 118 and attached to the upstream end 128 of the outer dome section 118 using, e.g., a welding process. Similarly, the attachment extension 134 may also be formed separately from the outer dome section 118 and attached to the upstream end 128 of the outer dome section 118 using, e.g., a welding process. Additionally, or alternatively, the inner dome section 116 may have a similar configuration.

For the embodiment depicted, the at least one liner of the liner assembly, and more specifically, the inner liner 102 and the outer liner 108, are each formed of a ceramic matrix composite (CMC) material, which is a non-metallic material having high temperature capability. Exemplary CMC materials utilized for such liners 102, 108 may include silicon carbide, silicon, silica or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y and combinations thereof) and inorganic fillers (e.g., pyrophyllite, wollastonite, mica, talc, kyanite and montmorillonite). At least certain CMC materials may have coefficients of thermal expansion in the range of about $1.3 \times 10^{-6}$ in/in/° F. to about $3.5 \times 10^{-6}$ in/in/° F. in a temperature of approximately 1000-1200° F.

Referring still to FIG. 2, the combustor assembly 100 further includes features for forming a seal with a component of the gas turbine engine positioned adjacent to the combustor assembly 100. More specifically, for the embodiment shown, the combustor assembly 100 is configured to form a seal with a first stage of airfoil members 150 of the turbine section of the gas turbine engine. The first stage of airfoil members 150 is, for the embodiment shown, a first stage of turbine nozzles, and includes a base defining an upstream end. More specifically, the first stage of airfoil members 150 includes an outer base 152 defining an upstream end 154 and an inner base 156 defining an upstream end 158. The upstream end 154 of the outer base 152 and the upstream end 158 of the inner base 156 each includes a seal plate 160. As will be appreciated from the discussion herein, the features of the combustor assembly 100 are configured to form a seal with the seal plates 160 of the upstream end 154 of the inner base 156 and the upstream end 158 of the outer base 152.

Figure 3:
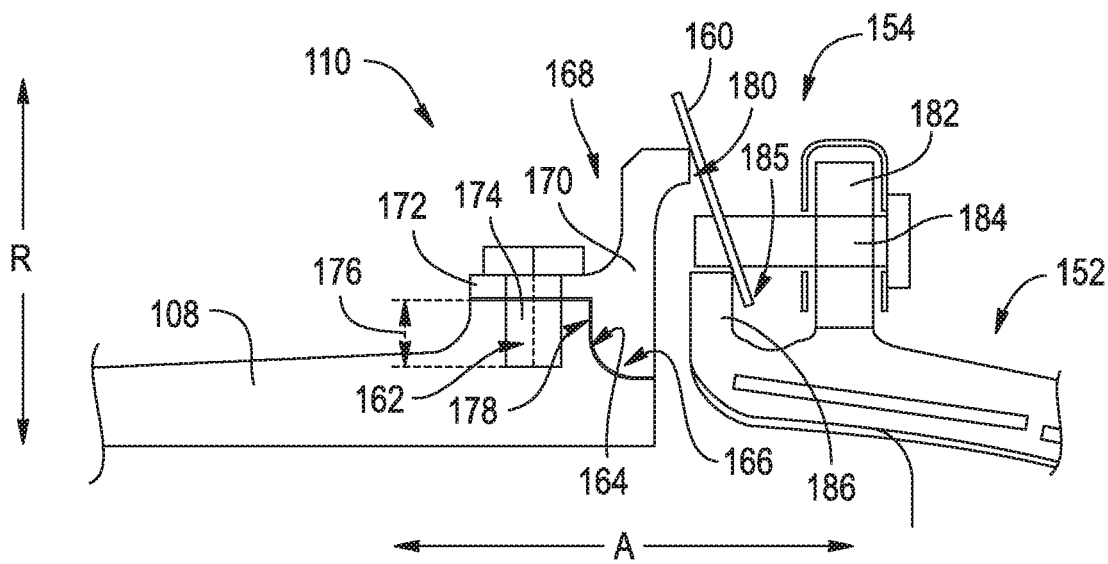
FIG. 3 is a close-up, schematic, cross-sectional view of a downstream end of an outer liner of the exemplary combustor assembly of FIG. 2 in accordance with an exemplary embodiment of the present disclosure exposed to non-operational temperatures.
Figure 6:
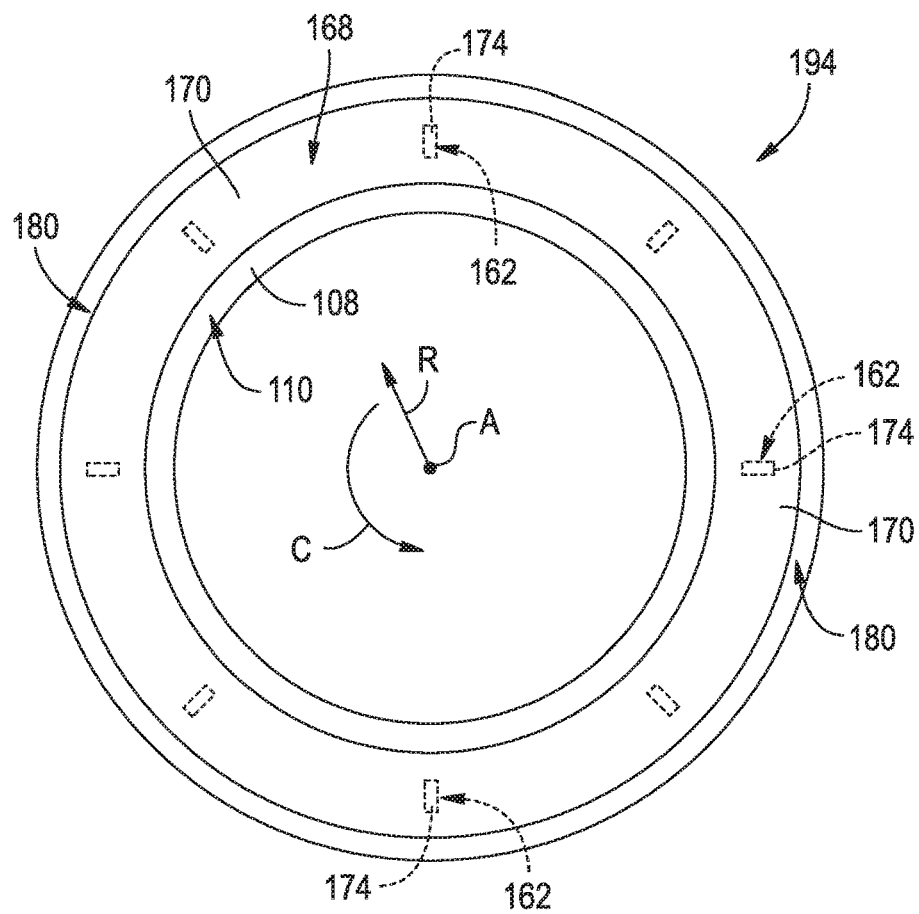
FIG. 6 is a schematic view of the downstream end of the outer liner of FIG. 3 as viewed along an axial direction of the gas turbine engine.

More specifically, referring now also to FIG. 3, providing a close-up view of the downstream end 110 of the outer liner 108 of the at least one liner of the liner assembly, as is depicted the downstream end 110 of the outer liner 108 defines a radial opening 162 and an interface surface 164 extending along the radial direction R and, as will be explained in greater detail below, e.g., with reference to FIG. 6, along the circumferential direction C. More particularly, the outer liner 108 of the liner assembly includes a groove 166 formed at its downstream end 110, with the interface surface 164 forming part of the groove 166. It will be appreciated, that is used herein, the term "downstream end" of a particular liner refers to a downstream section of the liner including less than twenty percent of an axial length of the liner.

Further, the combustor assembly 100 includes a seal member 168 operable with the downstream end 110 of the outer liner 108 to form the seal with an adjacent component of the gas turbine engine. For the embodiment shown, the seal member 168 generally includes a body 170, a flange 172, and a radial element 174. The flange 172 extends from the body 170 of the seal member 168 towards the radial opening 162. Specifically, for the embodiment shown, the flange 172 extends forward from the body 170 past/over the radial opening 162 defined by the outer liner 108. Further, the radial element 174 of the seal member 168 is coupled to the flange 172 and extends at least partially into the radial opening 162 defined by the outer liner 108. In certain exemplary embodiments, the radial element 174 may be fixedly coupled to the flange 172, e.g., through welding or some other fixed mechanical coupling (e.g., a screw connection, a glue or an epoxy connection, etc.). Alternatively, in other embodiments the radial element 174 of the seal member 168 may be movably coupled to the flange 172, such as slidably coupled to the flange 172.

Notably, for the embodiment shown, the radial opening 162 defined by the outer liner 108 is positioned immediately forward of the interface surface 164 and defines a length 176 along the radial direction R and a constant cross-sectional geometry along the length 176. For example, for the embodiment shown, the radial opening 162 defines a constant circular cross-sectional geometry along its length 176. Further for the embodiment shown, the radial element 174 of the seal member 168 defines a cross-sectional geometry that is substantially equal to the cross-sectional geometry of the radial opening 162 of the outer liner 108. For example, for the embodiment shown, the radial element 174 defines a circular cross-sectional geometry having a diameter substantially equal to a diameter of the circular cross-sectional geometry of the radial opening 162. For example, the radial element 174 may be configured as a pin or other suitable structure. However, in other embodiments, the radial opening 162 and radial element 174 may have other suitable complementary shapes.

Moreover, the body 170 of the seal member 168 defines a body surface 178 extending along the radial direction R and positioned adjacent to the interface surface 164 of the outer liner 108. The body surface 178 and interface surface 164 may together form a seal between the seal member 168 and the outer liner 108. It will be appreciated, that as used herein, the term "seal," as may be defined between two components, refers to the two components defining a relatively small, measured gap or, no gap, therebetween to limit an allowable airflow therebetween or prevent any airflow therebetween. Accordingly, in certain exemplary embodiments, a seal may refer to two components contacting one another and forming a substantially airtight seal, or alternatively may refer to two components defining a relatively small, measured gap therebetween to constrain an airflow therebetween in a desired manner.

Further, it will be appreciated that for the embodiment shown the body 170 of the seal member 168 contacts the seal plate 160 of the upstream end 154 of the outer base 152 to form a seal with the seal plate 160. More specifically, for the embodiment shown, the body surface 178 is positioned at a forward/upstream side of the seal member 168, and the body 170 further includes a seal surface 180 positioned at an aft/downstream side of the seal member 168 that contacts the seal plate 160 to form the seal with the seal plate 160.

Briefly, it will further be appreciated that the upstream end 154 of the outer base 152 further includes an assembly for holding the seal plate 160 in position and allowing the seal plate 160 to further form a seal with the upstream end 154 of the outer base 152. More particularly, the assembly includes a flange 182 with a bolt 184 extending therethrough to press an inner end 185 of the seal plate 160 against a lip 186 of the upstream end 154 of the outer base 152, as well as to press an outer end against the seal surface 180 of the base 170 of the seal member 168.

In such a manner, the seal member 168 may form a seal between the downstream end 110 of the outer liner 108 and an aft-adjacent component of the gas turbine engine (i.e., the first stage of airfoil members 150 for the embodiment shown).

As will be described in greater detail below, it will further be appreciated that the seal member 168 is configured to form a seal ring 194 (see FIG. 6) extending continuously in the circumferential direction C to form a circular shape around (at least partially) the downstream end 110 of the outer liner 108, which as noted above similarly has an annular shape. As is also noted above, the outer liner 108 may be formed of a CMC material. By contrast, however, for the embodiment shown the seal member 168 may be formed of a metal material. For example, the seal member 168 may be formed of a metal, such as a nickel-based superalloy (which may have a coefficient of thermal expansion of about $8.3\text{-}8.5\times10^{-6}$ in/in/° F. in a temperature of approximately 1000-1200° F.) or cobalt-based superalloy (which may have a coefficient of thermal expansion of about $7.8\text{-}8.1\times10^{-6}$ in/in/° F. in a temperature of approximately 1000-1200° F.). As such, during operation of the gas turbine engine, the seal member 168 may expand relative to the outer liner 108, such that an effective diameter along the radial direction R of the seal ring 194 formed by the seal member 168 increases relative to an effective diameter along the radial direction R of the downstream end 110 of the outer liner 108.

Figure 4:
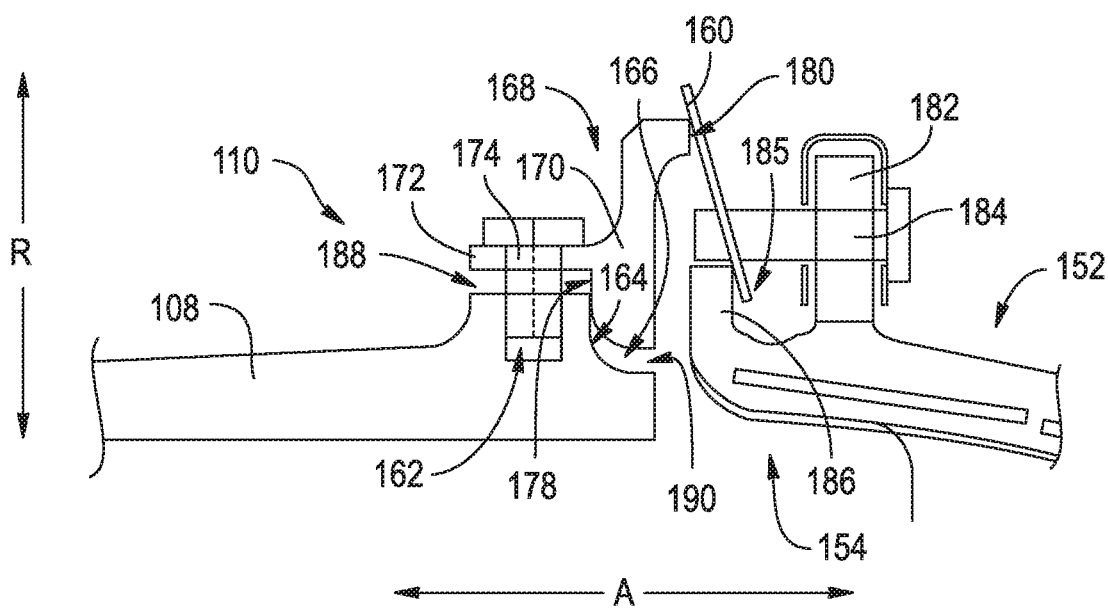
FIG. 4 is a close-up, schematic, cross-sectional view of the downstream end of the outer liner of FIG. 3 exposed to operational temperatures.

Referring now particular to FIG. 4, such an exemplary aspect is depicted. More specifically, FIG. 4 depicts the exemplary outer liner 108 and seal member 168 of FIG. 3 during operation of the gas turbine engine, wherein increased operational temperatures have caused the seal member 168 to expand relative to the outer liner 108. Accordingly, as is shown, the flange 172 of the seal member 168 now defines a radial gap 188 with the downstream end 110 of the liner 108 along the radial direction R, and similarly, the body 170 of the seal member 168 defines a similarly sized radial gap 190 with a radially inner surface of the groove 166. However, given the above-described configuration of the outer liner 108 and seal member 168, the seal member 168 may maintain the seal between the downstream end 110 of the outer liner 108 and the upstream end 154 of the adjacent component of the gas turbine engine.

More particularly, as is depicted, the body surface 178 of the body 170 of the seal member 168 is slidably engaged with the interface surface 164 defined by the outer liner 108 of the liner assembly. In such a manner, despite the fact that the seal member 168 has expanded relative to the outer liner 108, the body surface 178 and interface surface 164 may maintain a seal therebetween. Further, as is shown, the radial element 174 of the seal member 168 is slidably engaged with the radial opening 162 defined by the outer liner 108. In such a manner, the radial element 174 may ensure the seal member 168 retains its position along the axial direction A relative to the outer liner 108, while allowing for the seal member 168 to expand and/or contract along the radial direction R.

Figure 5:
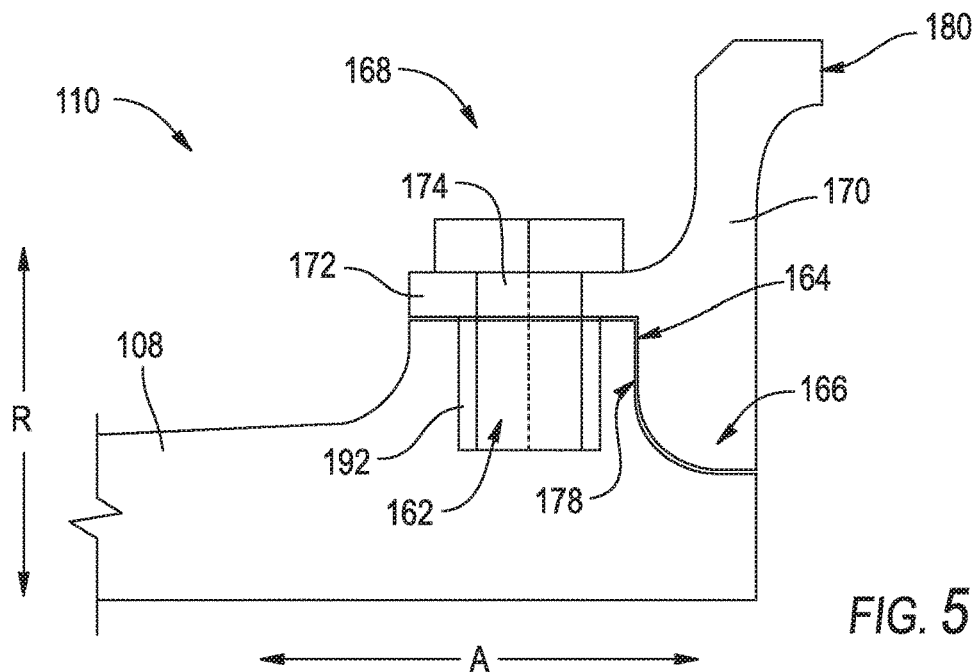
FIG. 5 is a close-up, schematic, cross-sectional view of a downstream end of an outer liner of a combustor assembly in accordance with another exemplary embodiment of the present disclosure.

It will be appreciated, however, that in other embodiments any other suitable radial opening 162 and radial element 174 configuration may be provided for constraining the seal member 168 along the axial direction A relative to the outer liner 108, while allowing for relative movement along the radial direction R. For example, in at least certain exemplary embodiments, such as the alternative exemplary embodiment of FIG. 5, the outer liner 108 may include a wear coating 192 positioned at least partially within the radial opening 162. For example, as is depicted in FIG. 5, the wear coating 192 may effectively be configured as a bushing or other material configured to interface with the radial element 174 of the seal member 168 to reduce a wear on the outer liner 108 (given the differing materials—ceramic matrix composite versus metal). However in other embodiments, no such wear coating 192 may be provided, or other suitable configurations may be provided.

Moreover, as noted above, the outer liner 108 extends about the circumferential direction C to define an annular shape, and similarly, the seal member 168 extends in the circumferential direction C to define an annular seal ring 194. Referring to FIG. 6, a schematic view is depicted of the downstream end 110 of the outer liner 108 of the exemplary combustor assembly 100 of FIGS. 2 through 4, with the seal member 168 positioned thereon. As is shown, the seal member 168 extends continuously along the circumferential direction C to form the circumferential seal ring 194, and the outer liner 108 similarly extends continuously along the circumferential direction C to form a similar annular shape. In such a manner, it will be appreciated that the interface surface 164 of the outer liner 108 (covered up by the seal member 168 in FIG. 6) extends continuously along the circumferential direction C to form a complete loop and the body surface 178 of the body 170 of the seal member 168 similarly extends continuously along the circumferential direction C to form a complete loop. The body surface 178 and interface surface 164 may together define a 360 degree seal for the combustor assembly 100.

Moreover, as is depicted schematically, it will be appreciated that the radial opening 162 described above and depicted in FIGS. 3 and 4 is a first radial opening 162 of a plurality of radial openings 162 defined by the outer liner 108 at the downstream end 110 of the outer liner 108. For the embodiment shown, the plurality of radial openings 162 defined by the outer liner 108 are spaced along the circumferential direction C. Further, as is also depicted schematically, it will also be appreciated that the radial element 174 of the seal member 168 is a first radial element 174 of a plurality of radial elements 174 of the seal member 168. Each radial element 174 of the plurality of radial elements 174 is coupled to the flange 172 of the seal member 168 and extends into a respective radial opening 162 the plurality radial openings 162 of the outer liner 108. In such a manner, the plurality of radial elements 174 positioned in the plurality of radial openings 162 may constrain the seal member 168 along the axial direction A relative to the outer liner 108 during operation of the gas turbine engine, while still allowing for relative radial expansion between the seal member 168 and the outer liner 108 during operation of the gas turbine engine.

Figure 7:
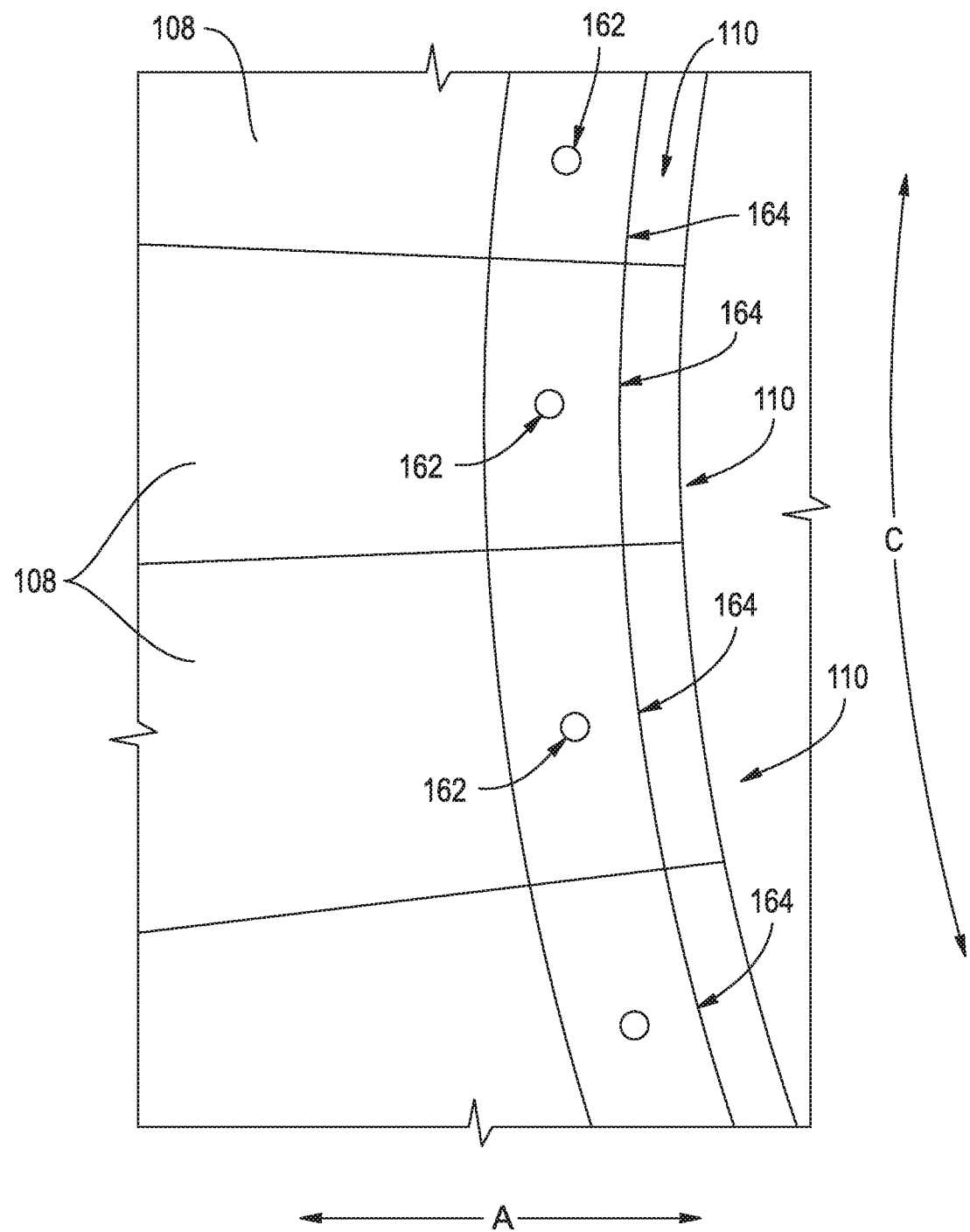
FIG. 7 is a schematic view of a downstream end of a liner assembly of a combustor assembly in accordance with another exemplary embodiment of the present disclosure as viewed along a radial direction of the gas turbine engine.

It will be appreciated, however, that in other exemplary embodiments, any other suitable configuration may be provided for the combustor assembly 100, gas turbine engine, etc. For example, referring now briefly to FIG. 7, a plan view of a downstream end of a liner assembly of a combustor assembly 100 in accordance with another exemplary embodiment of the present disclosure is provided. For the embodiments depicted in FIG. 7, the at least one outer liner 108 of the liner assembly is not a single outer liner extending continuously along the circumferential direction C, and instead is a plurality of outer liners 108. The plurality of outer liners 108 are arranged along the circumferential direction C to form an effectively continuous outer liner along the circumferential direction C. Each of the outer liners 108 may be configured in a similar manner to the outer liner 108 described above. For example, each of the outer liners 108 may define a downstream end 110, and one or more of such liners defines a radial opening 162 at the downstream end 110. Further, each of the liners defines an interface surface 164 extending along the radial direction R and along the circumferential direction C at the downstream end 110, such that the plurality of outer liners 108 together define an interface surface 164 extending continuously along the circumferential direction C to form a complete loop.

Moreover, it will be appreciated that although the exemplary seal members 168 described above with respect to FIGS. 3 through 6 were configured to form a seal between an outer liner 108 and an outer base 152 of a first stage of airfoil members 150, in other embodiments, additional or alternative seal members 168 may be provided to form a seal between a downstream end 104 of an inner liner 102 and an inner base 156 of the first stage of airfoil members 150 (see FIG. 2). For example, with such an embodiment the downstream end 104 of the inner liner 102 may define one or more radial openings and an interface surface, and the seal member may include a body having a body surface positioned adjacent to the interface surface, a flange, and a radial member coupled to the flange and extending at least partially into the radial opening of the inner liner. Notably, however, the seal member may be sized to define gaps (similar to gaps 188 and 190 in FIG. 4) when in cold/non-operational conditions to allow the seal member to expand during hot/operational conditions (e.g., operating conditions).

Figure 8:
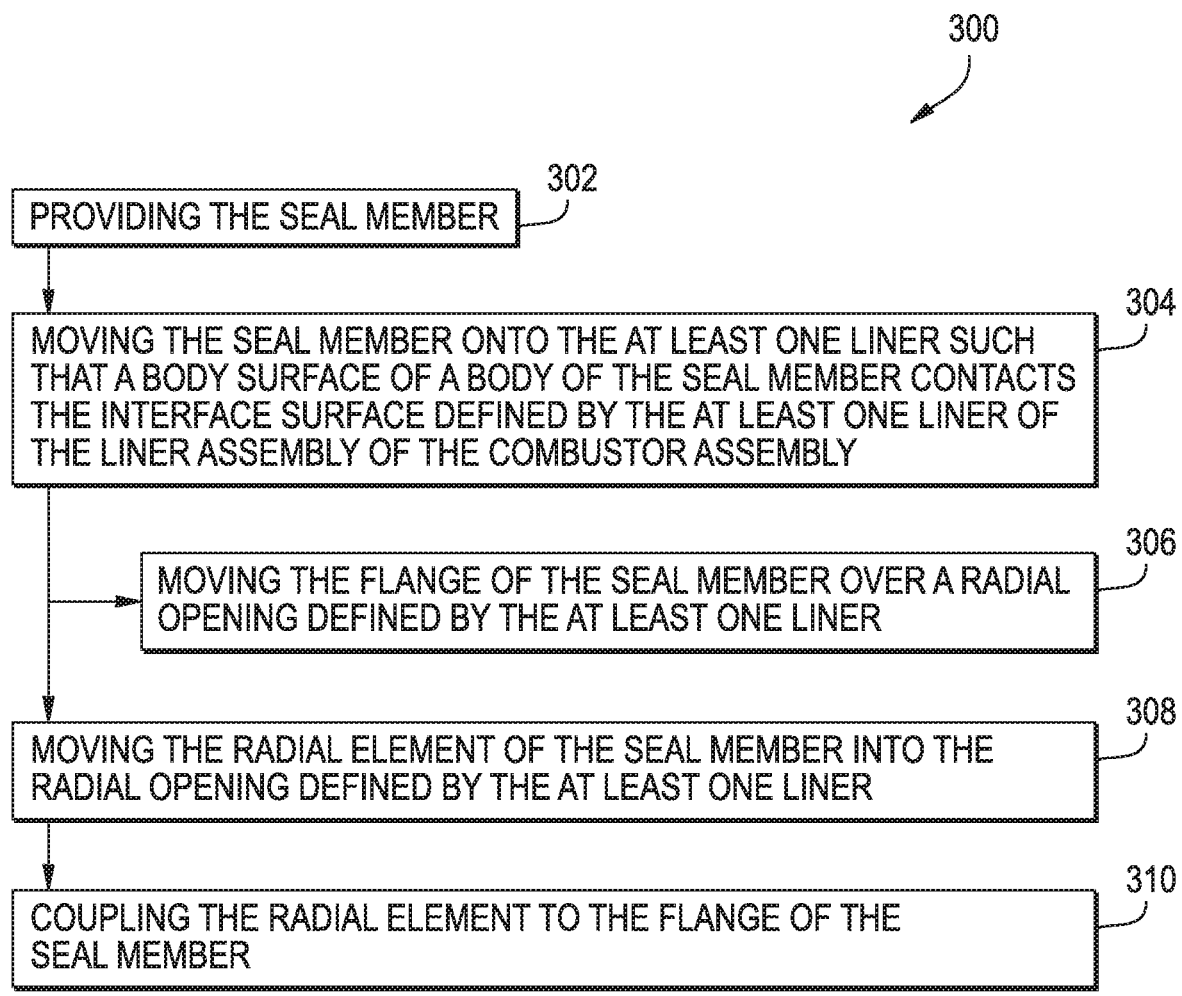
FIG. 8 is a flow diagram of a method for manufacturing a combustor assembly in accordance with an exemplary aspect of the present disclosure.

Referring now to FIG. 8, a flow diagram is provided of a method 300 for manufacturing a combustor assembly of a gas turbine engine in accordance with an exemplary aspect of the present disclosure. The combustor assembly manufactured according to the method 300 may be configured in a similar manner to one or more of the exemplary combustor assemblies described above others to FIGS. 1 through 7. Accordingly, it will be appreciated that the combustor assembly may include a liner assembly and a seal member, with the liner assembly including at least one liner defining an interface surface at the downstream end.

The method 300 generally includes at (302) providing the seal member. The seal member extends continuously along the circumferential direction to form the seal ring. Notably, as used herein, the term "providing" simply refers to making a component available, and does not expressly require a manufacturing or a forming of such component.

The method 300 further includes at (304) moving the seal member onto the at least one liner such that a body surface of a body of the seal member contacts the interface surface defined by the at least one liner of the liner assembly of the combustor assembly. For the exemplary aspect depicted, it will be appreciated that the seal member includes a flange, and moving the seal member onto the at least one liner at (304) includes at (306) moving the flange of the seal member over a radial opening defined by the at least one liner.

Further, for the exemplary aspect depicted, the seal member includes a radial element, and the method 300 further includes at (308) moving the radial element of the seal member into the radial opening defined by the at least one liner, and at (310) coupling the radial element to the flange of the seal member.

As with the exemplary embodiments described above, it will be appreciated that the at least one liner of the liner assembly may be formed of a ceramic matrix composite material, and the seal member may be formed of a metal material. Forming the combustor assembly in accordance with one or more exemplary aspects of the present disclosure, however, may allow for the seal member to move relative to the at least one liner along the radial direction during operation of the gas turbine engine, while maintaining a seal between the two components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustor assembly for a gas turbine engine defining a central axis, a radial direction and a circumferential direction, the combustor assembly comprising:
   a liner assembly at least partially defining a combustion chamber and comprising at least one liner extending between a downstream end and an upstream end, the downstream end of the at least one liner defining a radial opening and an interface surface extending along the circumferential direction and along the radial direction; and
   a seal member comprising a body, a flange, and a radial element, the body extending outwardly with respect to the central axis along the radial direction beyond the flange, the body defining a body surface extending along the radial direction and positioned adjacent the interface surface of the at least one liner, the flange extending forward from the body, and the radial element extending through the flange and into the radial opening defined by the at least one liner.

2. The combustor assembly of claim 1, wherein the at least one liner of the liner assembly is formed of a ceramic matrix composite material, and wherein the seal member is formed of a metal material.

3. The combustor assembly of claim 1, wherein the body surface of the body of the seal member is slidably engaged with the interface surface defined by the at least one liner of the liner assembly.

4. The combustor assembly of claim 1, wherein the body of the seal member defines a downstream seal surface configured for contacting a corresponding seal of an adjacent component within the gas turbine engine when installed.

5. The combustor assembly of claim 1, wherein the radial opening is a first radial opening of a plurality of radial openings defined by the at least one liner at the downstream end of the at least one liner, and wherein the plurality of radial openings are spaced along the circumferential direction.

6. The combustor assembly of claim 5, wherein the radial element of the seal member is a first radial element of a plurality of radial elements of the seal member, and wherein each radial element of the plurality radial elements is coupled to the flange of the seal member and extends into a respective radial opening of the plurality of radial openings defined by the at least one liner.

7. The combustor assembly of claim 1, wherein the radial opening defines a length along the radial direction and a constant cross-sectional geometry along the length.

8. The combustor assembly of claim 1, wherein the at least one liner includes a wear coating positioned within the radial opening.

9. The combustor assembly of claim 1, wherein the radial element of the seal member defines a cross-sectional geometry that is substantially equal to a cross-sectional geometry of the radial opening of the at least one liner.

10. The combustor assembly of claim 1, wherein the seal member extends continuously along the circumferential direction to form a circumferential seal ring.

11. The combustor assembly of claim 1, wherein the interface surface of the at least one liner extends continuously along the circumferential direction to form a complete loop.

12. The combustor assembly of claim 1, wherein the at least one liner includes a plurality of liners spaced along the circumferential direction, and wherein the plurality of liners together define the interface surface.

13. A gas turbine engine defining a central axis, a radial direction and a circumferential direction, the gas turbine engine comprising:
    a compressor section, a combustor section, and a turbine section arranged in serial flow order, the combustor section comprising a combustor assembly, the combustor assembly comprising
    a liner assembly at least partially defining a combustion chamber and comprising at least one liner extending between a downstream end and an upstream end, the downstream end of the at least one liner defining a radial opening and an interface surface extending along the circumferential direction and along the radial direction; and
    a seal member comprising a body, a flange, and a radial element, the body extending outwardly with respect to the central axis along the radial direction beyond the flange, the body defining a body surface extending along the radial direction and positioned adjacent the interface surface of the at least one liner, the flange extending forward from the body, and the radial element extending through the flange and into the radial opening defined by the at least one liner.

14. The gas turbine engine of claim 13, wherein the turbine section comprises a first stage of airfoil members, wherein the first stage of airfoil members comprises a base defining an upstream end, wherein the upstream end comprises a seal plate, and wherein the body of the seal member contacts the seal plate to form a seal with the seal plate.

15. The gas turbine engine of claim 14, wherein the body of the seal member defines a downstream seal surface, and wherein the downstream seal surface contacts the seal plate to form the seal with the seal plate.

16. The gas turbine engine of claim 13, wherein the at least one liner of the liner assembly is formed of a ceramic matrix composite material, and wherein the seal member is formed of a metal material.

17. The gas turbine engine of claim 13, wherein the radial opening is a first radial opening of a plurality of radial openings defined by the at least one liner at the downstream end of the at least one liner, and wherein the plurality of radial openings are spaced along the circumferential direction.

18. The gas turbine engine of claim 13, wherein the radial element of the seal member is a first radial element of a plurality of radial elements of the seal member and the radial opening is a first radial opening of a plurality of radial openings, and wherein each radial element of the plurality radial elements is coupled to the flange of the seal member and extends into a respective radial opening of the plurality of radial openings defined by the at least one liner.

19. The gas turbine engine of claim 13, wherein the radial opening defines a length along the radial direction and a constant cross-sectional geometry along the length.

20. The gas turbine engine of claim 13, wherein the at least one liner includes a wear coating positioned within the radial opening.

* * * * *